United States Patent [19]

Rogers

[11] 4,058,464

[45] Nov. 15, 1977

[54] HELICALLY WOUND EXPANDABLE FILTER

[75] Inventor: Robert N. Rogers, Carpentersville, Ill.

[73] Assignees: John R. Coffey; Vincent B. Conliff, deceased, ; part interest to each

[21] Appl. No.: 723,311

[22] Filed: Sept. 15, 1976

[51] Int. Cl.$^2$ .............................................. B01D 29/06
[52] U.S. Cl. .................................... 210/356; 210/487; 210/494 R
[58] Field of Search ........................ 210/487, 494, 356

[56] References Cited

U.S. PATENT DOCUMENTS

| 1,693,717 | 12/1928 | Lienesch | 210/487 X |
| 2,736,436 | 2/1956 | Fresch | 210/494 X |
| 3,356,227 | 12/1967 | Rule et al. | 210/494 X |
| 3,813,334 | 5/1974 | Bray | 210/487 X |
| 3,945,923 | 3/1976 | Rogers et al. | 210/494 X |
| 3,957,648 | 5/1976 | Roget et al. | 210/494 R X |

Primary Examiner—Frank A. Spear, Jr.
Assistant Examiner—Richard W. Burks
Attorney, Agent, or Firm—Hill, Gross, Simpson, Van Santen, Steadman, Chiara & Simpson

[57] ABSTRACT

A filter includes a rigid core through which the filtrate passes and about which there are wound a number of elongated porous tubular filter mediums that contain a resilient grid, there being a scrubber screen between successive turns of each filter medium, and resilient means yieldably enclosing the outermost surfaces of the helically wound parts. The filter mediums compress radially and expand radially in response to fluid pressure variations to produce relative movement between the filter mediums and the scrubber screen by which cleaning takes place, thereby extending filter life. The solids that have been filtered out are collected and built up on the screen and the helical assembly expands diametrically a corresponding amount.

8 Claims, 11 Drawing Figures

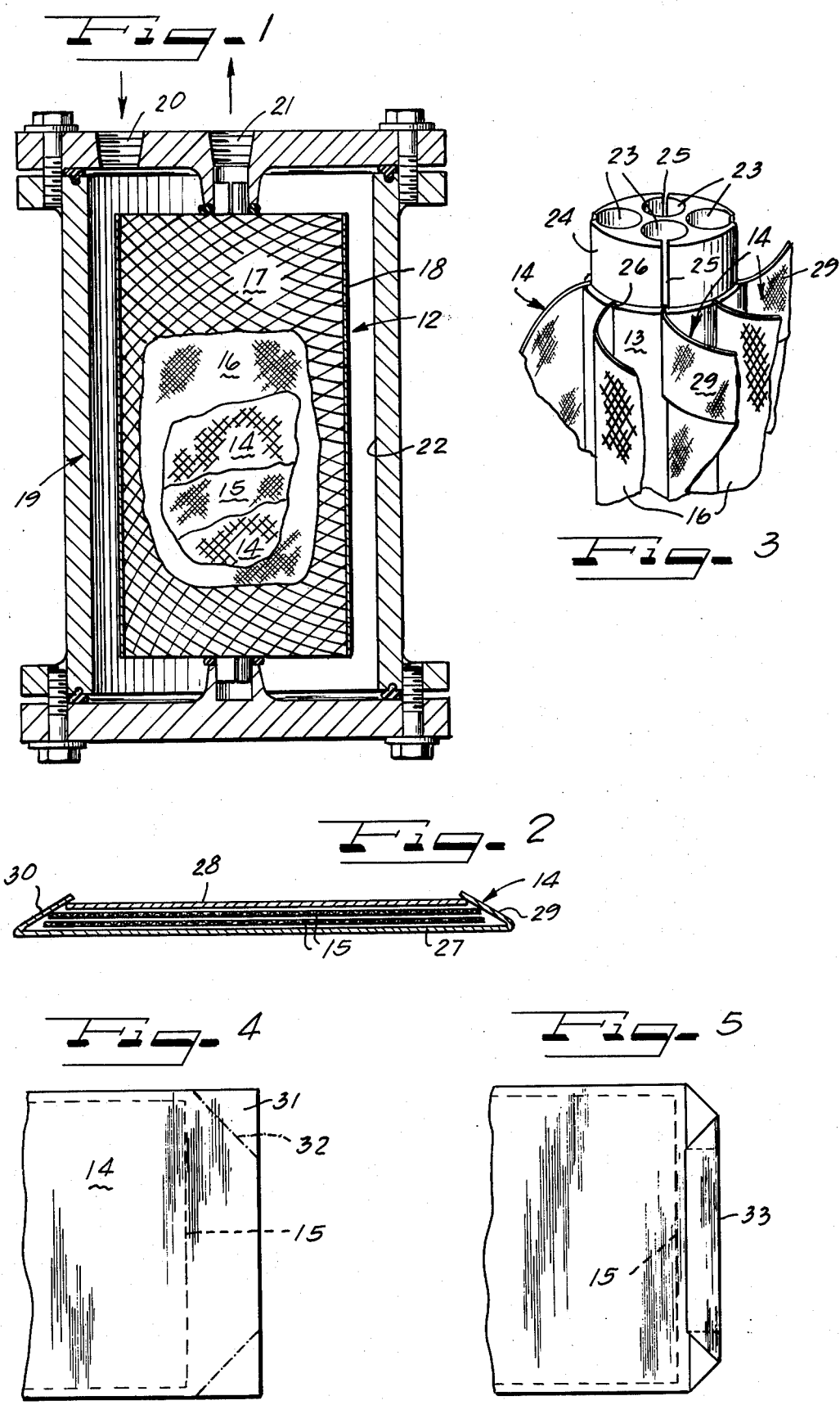

HELICALLY WOUND EXPANDABLE FILTER

BACKGROUND OF THE INVENTION

1. Field of the Invention

This invention relates to a filter for removing solids or sludge from a fluid.

2. Prior Art

In U.S. Pat. No. 3,945,923, in which I am a joint inventor, a filter includes a single filter medium of fabric wound upon a tubular core, there being a screen within the filter medium and there being an additional screen between turns of the wound filter medium. In this construction, a tie string is tied tightly about the completely assembled filter module so as to insure that there will be no relaxing of the wrapped fabric material assembly. This construction is subject to a disadvantage in that a relatively thin skin of filtered-out contaminant on the filter surface causes a prohibitive pressure drop across the filter, and also determines the useful life of such filter. Attempts have been previously made with respect to other filter structures for removing such contaminant as by shaking, twisting, physical or manual cleaning, including backwashing.

If one considers a filter application wherein relatively large quantities of contaminant are to be removed, the problems described above become somewhat more aggravated.

SUMMARY OF THE INVENTION

A filter assembly includes a rigid core about which there is wound a number of filter mediums which are tubular and which contain a resilient grid, there being a scrubber screen between successive turns to form a helix assembly enclosed by resilient means which can expand. When the fluid inlet pressure is applied, the filter medium yields to compress the resilient grid disposed therein, and each time that the pressure is relieved, the grid expands, such expansion being accompanied by relative movement between the filter medium and the scrubber screen whereby the contaminants are compacted into the scrubber screen and the filter medium is cleaned. As the thickness of contaminant builds up on the screen, the resilient means that surround the helical assembly expand, such expansion being ultimately limited by selectable design parameters.

Accordingly, it is an object of the present invention to provide a self-cleaning filter.

Another object of the present invention is to avoid the need for filter replacement until a large quantity of contaminant has accumulated.

A further object of the present invention is to provide a filter that can be used with highly contaminated fluids coupled with a relatively long service-life of the filter.

A still further object of the present invention is to provide a means which enables the ready removal of the filter from its housing after it has been fully contaminated.

Many other advantages and additional features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 1 is a cross-sectional view of a filter and housing provided in accordance with the principles of the present invention;

FIG. 2 is a transverse cross-sectional view of a filter medium shown wound onto a core in FIG. 1, the thickness thereof being exaggerated for clarity of illustration;

FIG. 3 is a fragmentary perspective view of a number of filter mediums and scrubber screens attached to the core;

FIGS. 4 and 5 are fragmentary elevational views of the closed end of the filter medium;

AS SHOWN ON THE DRAWINGS

Figure 6:
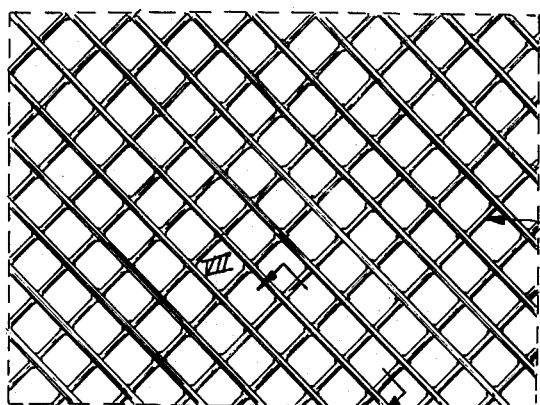
FIG. 6 is a plan view of an elongated resilient grid used in the filter medium.

The principles of the present invention are particularly useful when embodied in a filter as shown in FIG. 1, generally indicated by the numeral 12. The filter 12 includes a core 13, a filter medium 14 containing a pair of elongated resilient grids 15,15, a number of scrubber screens 16, the filter mediums 14 along with their internal elongated resilient grids 15 and the scrubber screens 16 extending jointly helically about the core 13 to form a helix assembly encircled by and held together by resilient means, here comprising a sock-like member 17 and a metal spring 18.

The filter 12 is enclosed by a housing 19 having a fluid inlet 20 which communicates primarily with the ends of the filter 12, and an outlet 21 which communicates with the core 13. According to the invention, the filter 12 initially has a minimum outside diameter, but during usage, that diameter gradually increases as the contaminants build up therein. Therefore, the housing 19 has an inside diameter 22 which is somewhat larger and which is spaced a substantial distance from the filter 12 initially. When the filter 12 has expanded so as to snuggly engage the bore 22 of the housing 19, the useful life of that filter is ended. While a build-up of 1/32 inch of contaminant on a filter medium defines the approximate useful life thereof, by successive transfers of such build-ups to the scrubber screen or screens, there may be an accumulation on the screen of as much as one inch of contaminant compacted onto the screen. Thus the initial radial clearance provided around the filter depends upon a particular application.

The core 13 has its upper end illustrated in FIG. 3. It may comprise an extrusion, and the material may be Cycolac (T), a product of Borg Warner Corporation. The core 13 has four axially extending filtrate passages 23 and the upper and lower ends 24 are slightly undercut whereby the ends of the core 13 are adapted to mate with structure of complemental configuration in a variety of housings such as 19. The core 13 has a slot 25 which extends from each of the passages 23 through the outside diameter of the core 13. Between the slots 25, there are provided a number of blind slots 26, which have a depth corresponding substantially to the amount that the end 24 is undercut. The material that surrounds the individual filtrate passages 23 is somewhat more substantial in configuration than a mere tube would be, thus adapting the core 13 to withstand high fluid pressures.

The filter medium 14 is in effect tubular, has a generally flat cross-section, is elongated for instance up to 6 ½ feet, and comprises porous material, an example of which is a DuPont product known as Tyvek No. 1085-D. As shown in FIG. 3, one strip 27 of this material is wider than another strip 28 of the same material, the strips 27 and 28 being superimposed with the marginal portions 29,30 of the strip 27 being folded over the edges of the strip 28. The elongated resilient grids 15,15 are enclosed within the tubular filter medium 14. Each filter medium 14 has a closed end and an open end. The open end is disposed in one of the slots 25 of the core 13. The core 13 is slightly resilient so that an expander tool (not shown) can be inserted into one of the passages 23 to slightly widen the gap in the slot 25 to permit the open end of the filter medium 14 and the resilient grids 15,15 to be inserted therein. Upon removal of such tool, secure attachment results.

The other end of each filter medium 14 may be closed as shown in FIGS. 4 and 5. For example, each corner 31 can be folded over at a prospective fold line 32, and then the marginal end can be folded as shown at 33 with the resilient grid or grids 15,15 terminating just short of such folded end.

The helix assembly is so wound that the marginal portions 29,30 of the strip 27 are on the outside, whereby they are drawn tightly against the strip 28 during winding. By using an overlapping connection at both the top and the bottom, a central bulge is avoided, which would tend to produce some instability in the assembly, and instead, the structure is wound with the thicker portions, the area where the overlap is, at the upper and lower ends, thereby producing a balanced configuration. More importantly, as is brought out in greater detail below, slight relative vertical slippage can take place between the strip 28 and the marginal portions 29,30, the term "vertical" having reference to FIGS. 1 and 3.

Figure 7:
FIG. 7 is a fragmentary cross-sectional view taken along line VII—VII of FIG. 6 in enlarged scale.
Figure 8:
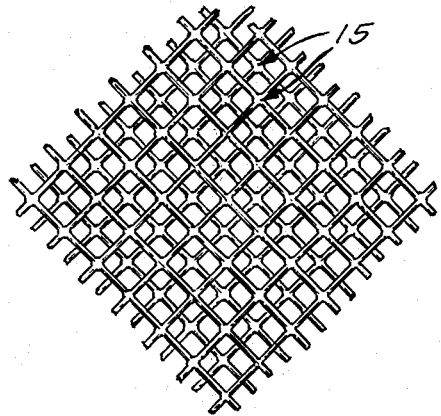
FIG. 8 is a diagram showing how two elongated resilient grids of FIG. 6 will tend to nest within each other.

Both the resilient grids 15,15 and the scrubber screen 16 can be made from DuPont's material known as Vexar 20-PDS. They are given different names herein because their functions are different. The elongated resilient grids 15,15 are clamped in the slots 25 of the core 13 at one end and they float at the closed end of the tubular filter medium 14. FIG. 6 illustrates a fragmentary enlarged portion of this material. This material is a form of screen which constitutes extruded plastic where the elements lie at an angle of about 45 degrees to the longitudinal axis of the filter medium 14. As shown in FIG. 7, there is no interweaving but at each juncture there is a thermal bond that creates a little high spot. When one of these resilient grids 15 is superimposed upon another as shown in FIG. 8, and a force is applied tending to squeeze them together, the high points of one grid 15 will tend to slip into one of the openings of the other grid 15. Further, when they are wound, since they are not on an identical radius, the grids cannot become continually nested, and thus a passage is assured for the filtrate. However, according to an important aspect of the present invention, the nesting as shown in FIG. 8 is achieved only with deformation of the resilient grids 15, a deformation that takes place in response to fluid pressure. When the fluid pressure is released, the grids 15,15 tend to move apart, thus moving the filter medium strips 27,28 apart.

The scrubber screen 16 only serves initially as a fluid conduit for unfiltered fluid to pass by, but as the filter medium 14 is caused to "breath" namely to compress in response to fluid pressure and to expand in response to separation of the resilient grids 15, the scrubber screen 16 also because of a different radius from that of adjacent strips 27,28 has relative motion with respect to the filter medium 14, whereby a scrubbing action takes place in response to the relative angular movement, and the contaminants become deposited on the screen 16 which thereafter serves as a support onto which further contaminants are compacted.

Once the helix assembly has been wound onto the core 13, resilient means are applied to the outermost surfaces of such helix assembly. In this embodiment, the resilient means includes the sock-like member 17 which comprises expandable material. For instance, the material may have a diamond mesh so that as it is diametrically expanded, it becomes progressively shorter. In any event, there's sufficient length to hold the outer ends of the filter mediums 14 closed. The member 17 can thus expand in accordance with the total growth in diameter that the filter 12 experiences as a consequence of progressive compacting of additional contaminants. If the use of the filter were terminated before the member 17 engaged the bore 22, the spring 18 could be omitted. However, as a practical matter, the need for filter replacement is normally sensed by a pressure build-up, and if that took place, the member 17 would be engaging the bore 22, whereupon the filter 12 would be stuck therein. Therefore, it is preferable to include the member 18. The member 18 is a metal spring of resilient sheet material formed as a tubular helix. With the filter at its new or smallest diameter, the spring 18 extends as a helix for less than two turns about the member 17. When the filter 12 has expanded to its fullest size, the spring 18 likewise has expanded but still has a small degree of overlap along its confronting vertical edges. The spring 18 thus is free to slide out of the housing 22 to facilitate removal of the filter 12.

Figure 9:
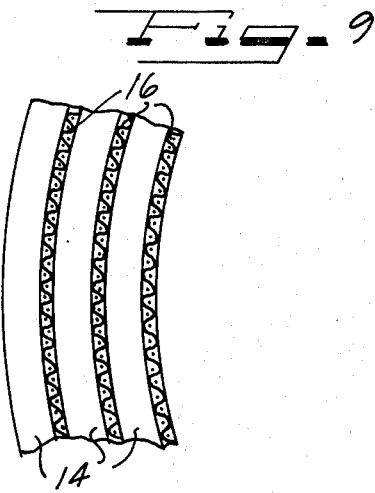
FIG. 9 is a fragmentary end elevational view of the filter shown in FIG. 1 when new and not under fluid pressure.
Figure 10:
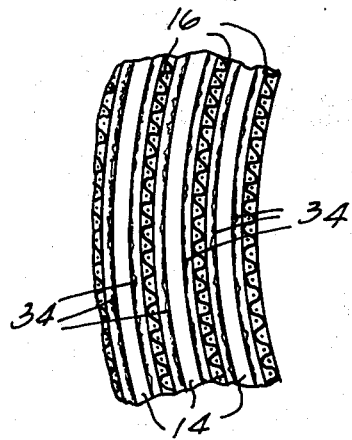
FIG. 10 corresponds to FIG. 9 after fluid pressure has been applied and some contaminants have collected.
Figure 11:
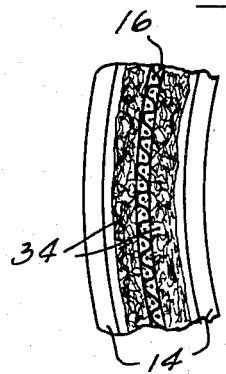
FIG. 11 is a view of a portion of FIG. 10 after the fluid pressure has been released and contaminants have been scrubbed off the filter medium onto the scrubber screen and compacted thereon.

When the new filter 12 is installed, the radial thickness of the filter medium 14 is about one eighth inch in radial thickness at each revolution, each such revolution being spaced by one of the scrubber screens 16. This condition is illustrated in FIG. 9. When fluid pressure is applied, the radial thickness of the filter medium 14 decreases with energy being stored within such filter mediums in the resilient grids (not shown in FIGS. 9-11). The slight reduction in radial thickness of the filter medium 14 facilitates liquid flow along the scrubber screen 16 so as to reach the entire outer surface of the filter mediums 14. FIG. 10 further illustrates the beginning of the collection of contaminants 34 in a diagramatic manner. When fluid pressure is removed, the resilient grids 15,15 expand radially so that the filter medium 14 resumes the size it initially had, illustrated in FIG. 9, thereby forcing the contaminant into the scrubber screen 16. However, as there is also a slight amount of relative circumferential movement, a scrubbing action takes place to clean the surface of the filter medium 14. As this cycle is repeated over and over, additional contaminant 34 becomes removed and it adheres more readily to previously removed compacted contaminant than it does to the filter medium 14 so that when fluid pressure is reapplied, the filter medium 14 readily draws away from such compacted contaminant 34, as shown in FIG. 11. However, at this time, there has been a partial unwinding of the helix and such unwinding continues in response to pressure applications, pressure removals, and contaminant build-up until further unwinding is arrested by engagement between the sheet metal spring 18 with the bore 22 of the housing 19.

By the foregoing construction, a filter is provided which has an extremely fine filtering mesh, and in spite of that fact, it has a relatively high flow-rate capacity with minimum pressure loss, and a most exceptional capacity for holding and supporting contaminants in great quantity without any adverse affect upon pressure drop or flow capacity, and thus providing exceptionally long service life.

The information provided herein is adequate for those skilled in the art to practice this invention, but should any reader hereof wish further information about such skill in the art, the reader is referred to my U.S. Pat. No. 3,945,923 to the portions of the specification thereof which pertain to the wound filter which, to the extent not inconsistent herewith, is incorporated by reference.

Although various minor modifications may be suggested by those versed in the art, it should be understood that I wish to embody within the scope of the patent warranted hereon, all such embodiments as reasonably and properly come within the scope of my contribution to the art.

I claim as my invention:

1. An expandable filter for fluids, comprising:
   a. a rigid core having at least one filtrate passage therein, said core having at least one slot in an external wall thereof in fluid communication with said passage;
   b. at least one elongated tubular porous filter medium of generally flat transverse cross-section having a closed end and an open end, said open end being secured to said core at said slot in fluid communication with said passage, said filter medium extending helically about said core and the outside of said filter medium being adapted to be exposed to the unfiltered fluid;
   c. an elongated helical grid disposed within said filter medium and extending substantially between said ends, said grid being resiliently compressible in a radial direction in response to fluid pressure increase on the outside of said filter medium;
   d. at least one elongated scrubber screen fixedly secured at one end to said core and extending helically thereabout between successive turns of said filter medium, and against which said filter medium is urged by a force from said resilient grid in response to fluid pressure decrease; and
   e. resilient means enclosing the outermost diametrical surfaces of said grid and screen, and being radially outwardly yieldable in response to said force from said resilient grid acting through a build-up of contaminant on said scrubber screen, whereby said filter expands diametrically in increments as contaminant builds up.

2. An expandable filter according to claim 1 in which said resilient means includes a sock-like member of material which is expanded as contaminant builds up.

3. An expandable filter according to claim 1 in which said resilient means includes a metal spring of resilient sheet material formed as a tubular helix of one and a fraction turns which unwinds as contaminant builds up.

4. An expandable filter assembly according to claim 1, the attachment of said scrubber screen to said core being at a blind slot in said core angularly spaced from said first named slot.

5. An expandable filter assembly according to claim 1, said core being a cylindrical body having a plurality of said filtrate passages each having one of said slots at which slots a corresponding number of said filter mediums is connected, there being a corresponding number of said scrubber screens separating said filter mediums.

6. An expandable filter assembly according to claim 5 in which said resilient means includes a sock-like member of material surrounded by a metal spring of sheet material formed as a tubular helix of one and a fraction turns, which respectively expand and unwind as contaminant builds up.

7. An expandable filter assembly according to claim 1, said filter medium comprising a pair of superimposed strips of flexible porous material, one of which is wider and has marginal edges folded over the edges of the other strip, said grid being between said strips, whereby the folded marginal edges are disposed adjacent to the ends of said core.

8. An expandable filter assembly according to claim 1 including a housing enclosing the structure of claim 1, said housing having an outlet in fluid communication with said filtrate passage, and an inlet in fluid communication with the outside of each said porous filter medium, there initially being a substantial radial clearance between said housing and said resilient means into which said structure can grow.

* * * * *